United States Patent
Yang et al.

(10) Patent No.: US 12,012,512 B2
(45) Date of Patent: Jun. 18, 2024

(54) ABRASION RESISTANCE FIBER

(71) Applicant: TAIWAN TEXTILE RESEARCH INSTITUTE, New Taipei (TW)

(72) Inventors: Jung Yang, New Taipei (TW); Wei-Jen Lai, New Taipei (TW)

(73) Assignee: TAIWAN TEXTILE RESEARCH INSTITUTE, New Taipei (TW)

( * ) Notice: Subject to any disclaimer, the term of this patent is extended or adjusted under 35 U.S.C. 154(b) by 363 days.

(21) Appl. No.: 17/142,354

(22) Filed: Jan. 6, 2021

(65) Prior Publication Data
US 2021/0301124 A1     Sep. 30, 2021

(30) Foreign Application Priority Data
Mar. 31, 2020 (TW) ............... 109111060

(51) Int. Cl.
*D01F 6/62* (2006.01)
*C08L 67/02* (2006.01)

(52) U.S. Cl.
CPC ........... *C08L 67/02* (2013.01); *C08L 2201/08* (2013.01); *C08L 2203/12* (2013.01)

(58) Field of Classification Search
CPC .. C08L 67/02; C08L 2201/08; C08L 2203/12; D01F 6/62
USPC .......................................... 428/395
See application file for complete search history.

(56) References Cited

U.S. PATENT DOCUMENTS

| | | | |
|---|---|---|---|
| 9,868,854 B2 | 1/2018 | Ueno | |
| 2003/0124344 A1* | 7/2003 | Wieners | B32B 27/18 428/352 |
| 2011/0183563 A1 | 7/2011 | Ochi et al. | |
| 2016/0011534 A1* | 1/2016 | Sano | G03G 9/09335 430/110.2 |
| 2018/0206564 A1* | 7/2018 | Ji | A41D 20/00 |

FOREIGN PATENT DOCUMENTS

| | | | | |
|---|---|---|---|---|
| CN | 101641464 A | | 2/2010 | |
| CN | 103397516 A | | 11/2013 | |
| CN | 103388193 B | | 11/2015 | |
| CN | 105271261 A | * | 1/2016 | |
| CN | 103469335 B | | 3/2016 | |
| CN | 105401333 A | | 3/2016 | |
| CN | 106633691 A | | 5/2017 | |
| CN | 106480581 B | * | 5/2019 | ............... D02G 3/04 |
| CN | 110747582 A | | 2/2020 | |
| EP | 0382175 B1 | | 1/1995 | |
| JP | 2008106418 A | * | 5/2008 | |
| JP | 5157590 B2 | | 3/2013 | |
| TW | 201823535 A | | 7/2018 | |
| WO | WO-2008055643 A1 | * | 5/2008 | ............... C08J 3/226 |
| WO | WO-2014003487 A1 | * | 1/2014 | ........... B29C 55/005 |

* cited by examiner

*Primary Examiner* — Andrew T Piziali
(74) *Attorney, Agent, or Firm* — McClure, Qualey & Rodack, LLP

(57) ABSTRACT

An abrasion resistance fiber includes 90.0 parts by weight to 99.0 parts by weight of a fiber body, 0.5 parts by weight to 7.5 parts by weight of an abrasion agent, 0.1 parts by weight to 0.5 parts by weight of a paraffin-based lubricant, and 0.1 parts by weight to 0.3 parts by weight of an antioxidant. The fiber body includes polyethylene terephthalate (PET). The abrasion agent is attached to a surface of the fiber body and includes silicon dioxide aerogels.

9 Claims, 3 Drawing Sheets

ABRASION RESISTANCE FIBER

RELATED APPLICATION

This application claims priority to Taiwan Application Serial Number 109111060, filed Mar. 31, 2020, which is herein incorporated by reference.

BACKGROUND

Field of Invention

The present disclosure relates to a textile material, and particularly relates to an abrasion resistance fiber.

Description of Related Art

Under a trend of globalization, textile industry faces strong pressure due to competition. Textile traders must constantly develop new technologies and diversified products for global competition. As more people in modern society participate in outdoor activities such as mountaineering, rock climbing, skiing, etc., consumers pay more attention to the durability of supplies for outdoor activities. Therefore, how to improve an abrasion resistance property of fabric has gradually become an important issue for textile industry researchers.

SUMMARY

An aspect of the present disclosure relates in general to an abrasion resistance fiber.

According to some embodiments of the present disclosure, the abrasion resistance fiber includes 90.0 parts by weight to 99.0 parts by weight of a fiber body, 0.5 parts by weight to 7.5 parts by weight of an abrasion agent, 0.1 parts by weight to 0.5 parts by weight of a paraffin-based lubricant, and 0.1 parts by weight to 0.3 parts by weight of an antioxidant. The fiber body includes polyethylene terephthalate (PET). The abrasion agent is attached to a surface of the fiber body and includes silicon dioxide aerogels.

In some embodiments of the present disclosure, the abrasion agent is attached to the surface of the fiber body without infiltrating into the fiber body.

In some embodiments of the present disclosure, the paraffin-based lubricant is disposed between the fiber body and the abrasion agent, and a weight-average molecular weight of the paraffin-based lubricant is between 3000 and 10000.

In some embodiments of the present disclosure, an abrasion resistance of a fabric fabricated by the abrasion resistance fiber is greater than 2800 cycles under ASTM D3884 test.

In some embodiments of the present disclosure, a mean diameter of the abrasion agent is between 1 μm and 20 μm.

In some embodiments of the present disclosure, an average density of the abrasion agent is between 0.04 $g/cm^3$ and 0.10 $g/cm^3$.

In some embodiments of the present disclosure, a porosity of the silicon dioxide aerogels is between 90% and 99%.

In some embodiments of the present disclosure, a mean diameter of the silicon dioxide aerogels is between 10 nm and 30 nm.

In some embodiments of the present disclosure, an average surface area of the silicon dioxide aerogels is between 600 $m^2/g$ and 800 $m^2/g$.

In some embodiments of the present disclosure, a heat resistance temperature of the paraffin-based lubricant is between 290° C. and 300° C.

In the aforementioned embodiments of the present disclosure, by adding the paraffin-based lubricant, the abrasion agent can be effectively dispersed and attached to the surface of the fiber body. Accordingly, the abrasion resistance fiber of the present disclosure has good abrasion resistance property and hydrophobicity.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
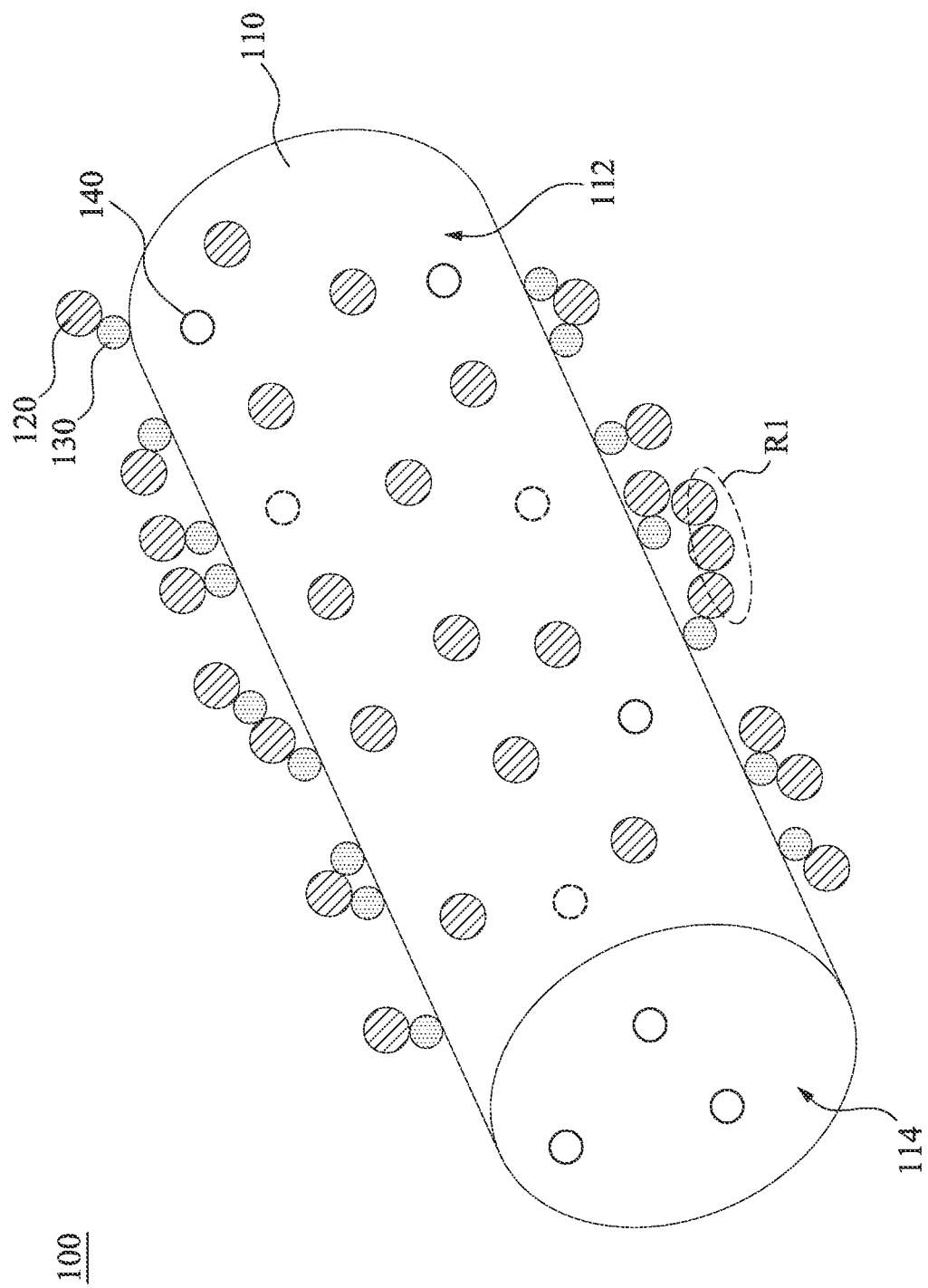
FIG. 1 is a three-dimensional schematic view illustrating an abrasion resistance fiber according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

The present disclosure provides an abrasion resistance fiber. By adding specific amount of an abrasion agent and a paraffin-based lubricant, the abrasion agent can be uniformly attached to a surface of a fiber body, such that the abrasion resistance fiber of the present disclosure has better abrasion resistance property and hydrophobicity relative to the conventional fibers. The abrasion resistance fiber of the present disclosure can be fabricated into a fabric with abrasion resistance property and hydrophobicity, which has a wide range of product applications.

FIG. 1 is a three-dimensional schematic view illustrating an abrasion resistance fiber 100 according to some embodiments of the present disclosure. The abrasion resistance fiber 100 includes 90.0 parts by weight to 99.0 parts by weight of a fiber body 110, 0.5 parts by weight to 7.5 parts by weight of an abrasion agent 120, 0.1 parts by weight to 0.5 parts by weight of a paraffin-based lubricant 130, and 0.1 parts by weight to 0.3 parts by weight of an antioxidant 140. The abrasion agent 120 is attached to a surface 112 of the fiber body 110 and includes silicon dioxide aerogels. In some embodiments, a yarn fitness of the abrasion resistance fiber 100 may be between 70d/48f and 240d/48f, so as to be applied to various fabrics. It is noted that, for clarity and convenience of explanation, the above components are not illustrated in actual proportions, that is, the proportions of the components illustrated in FIG. 1 are not intended to limit the present disclosure.

The abrasion resistance fiber 100 includes 90.0 parts by weight to 99.0 parts by weight of the fiber body 110, and the fiber body 110 includes polyethylene terephthalate (PET). In some embodiments, the fiber body 110 may further include polybutylene terephthalate (PBT), polypropylene terephthalate (PTT), or combinations thereof. Stated differently, the fiber body 110 may be a single component or a mixture of multiple components.

The abrasion resistance fiber 100 includes 0.5 parts by weight to 7.5 parts by weight of the abrasion agent 120, and the abrasion agent 120 is attached to the surface 112 of the fiber body 110. In detail, in some embodiments, the abrasion agent 120 is attached to the surface 112 of the fiber body 110 without infiltrating into the fiber body 110. In other words, the abrasion agent 120 does not exist within the fiber body 110 when viewing from a cross section 114 of the fiber body 110 of the abrasion resistance fiber 100. The abrasion agent 120 is configured to improve the abrasion resistance property of the fiber, such that the abrasion resistance fiber 100 and the textiles fabricated therefrom can have a longer usage lifetime. In some embodiments, a mean diameter of the abrasion agent 120 may be between 1 μm and 20 μm, such that the abrasion agent 120 may have a smaller volume than the fiber body 110, thereby reducing an overall graininess of the abrasion resistance fiber 100. In some embodiments, an average density of the abrasion agent 120 may be between 0.04 g/cm$^3$ and 0.10 g/cm$^3$, such that the abrasion agent 120 may have a lower density than the fiber body 110, and hence the abrasion agent 120 is only attached to the surface 112 of the fiber body 110 without infiltrating into the fiber body 110.

Figure 2:
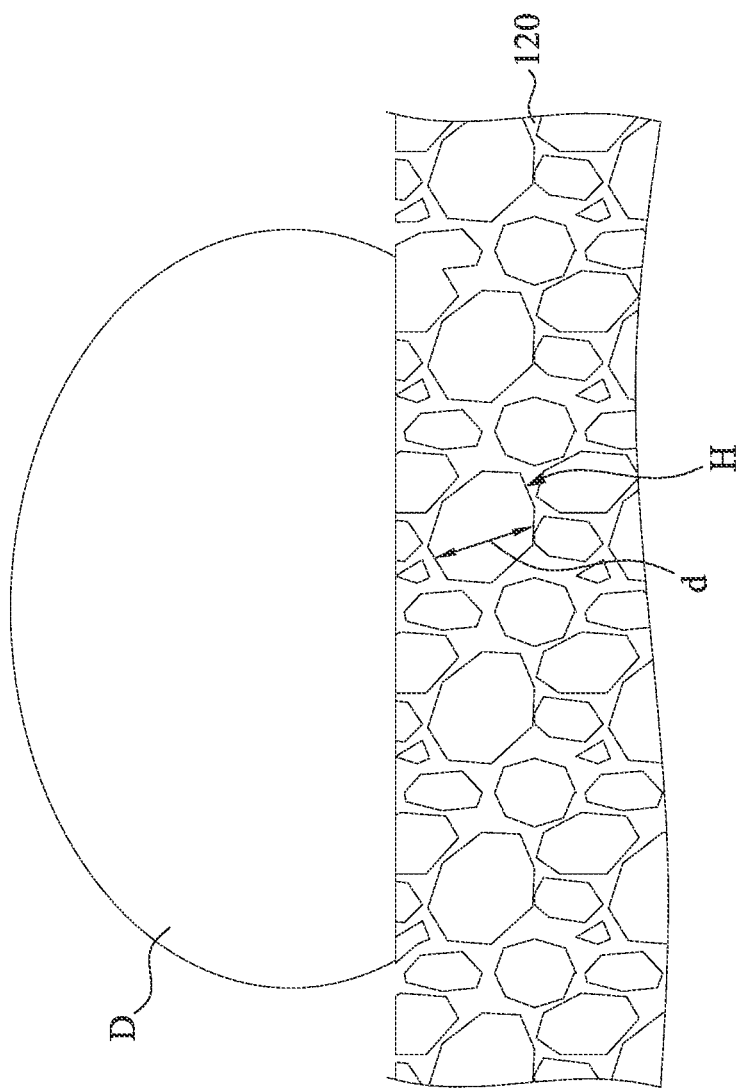
FIG. 2 is a partial enlargement schematic view illustrating the abrasion agent disposed on the surface of the fiber body and a water droplet dropped to the abrasion resistance fiber of FIG. 1.

The abrasion agent 120 includes silicon dioxide aerogels, and the silicon dioxide aerogels has a plurality of pores H. Specifically, please refer to FIG. 2 for now, in which FIG. 2 is a partial enlargement schematic view illustrating the abrasion agent 120 (e.g., the abrasion agent 120 in region R1) and disposed on the surface 112 of the fiber body 110 and a water droplet D dropped to the abrasion resistance fiber 100 of FIG. 1. As shown in FIG. 2, the silicon dioxide aerogels in the abrasion agent 120 has a plurality of the pores H. In some embodiments, a porosity of the silicon dioxide aerogels may be between 90% and 99%, and a mean diameter d of the silicon dioxide aerogels may be between 10 nm and 30 nm. In other words, the abrasion agent 120 may be a grid structure having a plurality of nano-level pores H. As such, the abrasion agent 120 can prop up the water droplet D dropped to its surface to prevent the water droplet D from further infiltrating into the fiber body 110, thereby giving the abrasion resistance fiber 100 (shown in FIG. 1) a good hydrophobicity. In detail, when the porosity and the mean diameter d of the silicon dioxide aerogels respectively exceed the above ranges, the abrasion agent 120 may not be able to isolate moisture, thereby making the hydrophobicity of the abrasion resistance fiber 100 worse. In addition, since the abrasion agent 120 includes silicon dioxide aerogels, it can have good heat resistance property, which is beneficial to the fabrication of the abrasion resistance fiber 100. For example, in some embodiments, a heat resistance temperature of the abrasion agent 120 may reach above 320° C.

In some embodiments, an average surface area of the silicon dioxide aerogels may be between 600 m$^2$/g and 800 m$^2$/g, which gives benefits to strengthen the aforementioned characteristics of the abrasion agent 120 (e.g., low density, high porosity, hydrophobicity, and heat resistance property, etc.). In addition, since the silicon elements in the silicon dioxide aerogels have a low friction coefficient, the abrasion resistance property of the abrasion resistance fiber 100 (shown in FIG. 1) can be improved.

Please refer back to FIG. 1. The abrasion resistance fiber 100 includes 0.1 parts by weight to 0.5 parts by weight of the paraffin-based lubricant 130. In preferred embodiments, the abrasion resistance fiber 100 includes 0.1 parts by weight to 0.4 parts by weight of the paraffin-based lubricant 130. The paraffin-based lubricant 130 is configured to make the abrasion agent 120 be uniformly dispersed on and attached to the surface 112 of the fiber body 110. In some embodiments, the paraffin-based lubricant 130 is attached to the surface 112 of the fiber body 110 and disposed between the fiber body 110 and the abrasion agent 120. In some embodiments, a weight-average molecular weight of the paraffin-based lubricant 130 may be between 3000 and 10000, such that the paraffin-based lubricant 130 can be better attached between the fiber body 110 and the abrasion agent 120. In addition, the paraffin-based lubricant 130 having the above weight-average molecular weight has a good heat resistance property, which is good for the fabrication of the abrasion resistance fiber 100. For example, in some embodiments, a heat resistance temperature of the paraffin-based lubricant 130 may be between 290° C. and 300° C.

The abrasion resistance fiber 100 includes 0.1 parts by weight to 0.3 parts by weight of the antioxidant 140. In some embodiments, the antioxidant 140 may be disposed on the surface 112 of the fiber body 110 and within the fiber body 110. In detail, the antioxidant 140 may exist within the fiber body 110 when viewing from a cross section 114 of the fiber body 110 of the abrasion resistance fiber 100. The antioxidant 140 can prevent the components in the abrasion resistance fiber 100 from degrading during the fabrication of the abrasion resistance fiber 100, thereby ensuring that each component maintains its characteristics and exerts its efficacy. In some embodiments, the antioxidant 140 may include phenolic compounds. For example, the antioxidant 140 may be 3-(3,5-di-tert-butyl-4-hydroxyphenyl)methyl propionate, 3,3'-bis(3,5-di-tert-butyl-4-hydroxyphenyl)-N, N'-(hexamethylene)dipropionamide, 1,3,5-trimethyl-2,4,6-tris(3,5-di-tert-butyl-4-hydroxybenzyl)benzene, or combinations thereof. Since the phenol groups in the phenolic compounds can react with free radicals in peroxides, the components in the abrasion resistance fiber 100 can be prevented from degrading during the fabrication of the abrasion resistance fiber 100.

In some embodiments, a substrate powder used to form the fiber body 110, the abrasion agent 120 including the silicon dioxide aerogels, the paraffin-based lubricant 130, and the antioxidant 140 may be mixed uniformly in the aforementioned amount (parts by weight), and then placed into an extruder to undergo a kneading (granulation) process, such that masterbatches of the abrasion resistance fiber 100 are formed. Next, a melt-spinning process is performed on the masterbatches to further form the abrasion resistance fiber 100 of the present disclosure. In some embodiments, the extruder can be, for example, a single-screw extruder or a twin-screw extruder. In some embodiments, a rotation speed of a screw may be between 100 rpm and 400 rpm. In some embodiments, a kneading temperature may be between 260° C. and 280° C.

During the kneading process, since the density of the abrasion agent 120 including the silicon dioxide aerogels is much smaller than the density of the substrate powder, the abrasion agent 120 tends to be suspended above the substrate powder, which is harmful to the uniform mixing of the components. However, by adding a specific amount of the paraffin-based lubricant 130, the abrasion agent 120 can be uniformly mixed with the substrate powder during high-speed rotation, and thus being uniformly attached to a surface of the substrate powder. In detail, paraffin-based lubricant 130 can play a role to bridge the abrasion agent 120 and the substrate powder, such that the paraffin-based lubricant 130 is not only disposed on the surface of the substrate powder, but also between the abrasion agent 120 and the substrate powder. In addition, as mentioned above, since the abrasion agent 120 including the silicon dioxide aerogels and the paraffin-based lubricant 130 can have good heat resistance properties, and the antioxidant 140 can avoid the substrate powder, the abrasion agent 120, and the paraffin-based lubricant 130 from degrading under the aforementioned kneading temperature, the characteristics of each component can be maintained, and hence the yield of the abrasion resistance fiber 100 fabricated subsequently can be improved.

In the following descriptions, abrasion resistance fibers of multiple embodiments and fibers of multiple comparative examples are listed to undergo various tests in order to verify the efficacies of the present disclosure. The components and contents of each embodiment and comparative example are shown in Table 1.

TABLE 1

|   | fiber body (parts by weight) | silicone (parts by weight) | abrasion agent (parts by weight) | paraffin-based lubricant and antioxidant (parts by weight) |
|---|---|---|---|---|
| embodiment 1 | 98.5 | N/A | 1 | 0.5 |
| embodiment 2 | 96.5 | N/A | 3 | 0.5 |
| embodiment 3 | 94.5 | N/A | 5 | 0.5 |
| comparative example 1 | 100 | N/A | N/A | N/A |
| comparative example 2 | 94.5 | 5 | N/A | 0.5 |

Figure 3:
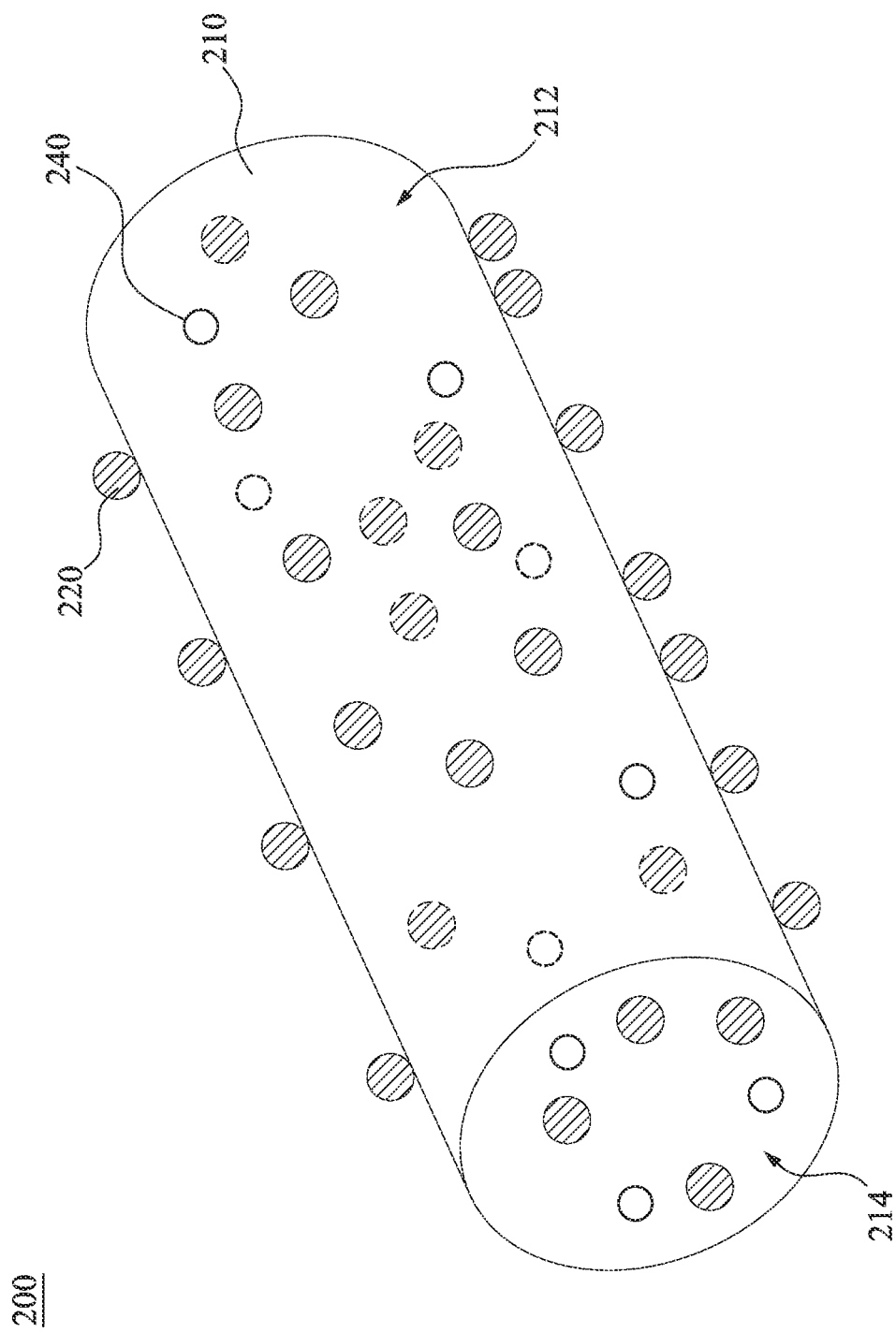
FIG. 3 is a three-dimensional schematic view illustrating the fiber of comparative example 2.

In the comparative examples shown in Table 1, comparative example 1 is a fiber fabricated by commercially-available common polyester PET, and comparative example 2 is a fiber fabricated by silicone instead of the abrasion agent. In detail, please refer to FIG. 3, which is a three-dimensional schematic view illustrating the fiber 200 of comparative example 2. As shown in FIG. 3, the silicone 220 in the fiber 200 of comparative example 2 is not only disposed on the surface 212 of the fiber body 210 but also infiltrating into the fiber body 210. In other words, the silicone 220 may exist within the fiber body 210 when viewing from a cross section 214 of the fiber body 210 of the fiber 200. In addition, the fiber 200 of comparative example 2 does not include the paraffin-based lubricant.

In the above embodiments and/or comparative examples, a material of the fiber body is polyethylene terephthalate, a material of the silicone is silicone resin, and a material of the abrasion agent is silicon dioxide aerogels having the aforementioned characteristics, the paraffin-based lubricant is HI-WAX™ 405MP (product name, purchased from Mitsui Chemicals), and the antioxidant is IRGANOX-1010 (product name, purchased from BASF Chemicals).

<Abrasion Resistance Test>

The abrasion resistance fiber of each embodiment and the fiber of each comparative example are fabricated into fabrics having the same structure, and the abrasion resistance of each fabric is tested under ASTM D3884 test. The manufacturing parameters and test results for each fabric are shown in Table 2.

TABLE 2

|   | yarn fitness | warp yarns per inch | weft yarns per inch | abrasion resistance (cycles) |
|---|---|---|---|---|
| embodiment 1 | 70D/48f | 120 | 80 | 2833 |
| embodiment 2 | 70D/48f | 120 | 80 | 2919 |
| embodiment 3 | 70D/48f | 120 | 80 | 3095 |

TABLE 2-continued

|   | yarn fitness | warp yarns per inch | weft yarns per inch | abrasion resistance (cycles) |
|---|---|---|---|---|
| comparative example 1 | 70D/48f | 120 | 80 | 320 |
| comparative example 2 | 70D/48f | 120 | 80 | 1000 |

As shown in Table 2, the abrasion resistance of the fabrics fabricated by the abrasion resistance fibers of embodiments 1 to 3 of the present disclosure is more than 2800 cycles under the test of ASTM D3884 method, indicating a better abrasion resistance property. In addition, as the amount of the abrasion agent added increases, the abrasion resistance increases accordingly. For example, the abrasion resistance of the fabric fabricated by the abrasion resistant fiber of embodiment 3 is more than 3000 cycles under the test of ASTM D3884 method. In contrast, the abrasion resistance of the fabric fabricated only by the commercially-available common polyester PET is only about 320 cycles, indicating a poorer abrasion resistance property. Furthermore, the abrasion resistance of the fabric fabricated by the silicone instead of the abrasion agent is far worse than that of the fabrics fabricated by the abrasion resistance fibers of the present disclosure.

<Moisture Absorption Test>

The abrasion resistance fiber of each embodiment and the fiber of each comparative example are fabricated into fabrics having the same structure, and the fabrics are respectively placed in different environments to respectively obtain their weights W1 to W3. The moisture regain ratios and the moisture absorption ratios are then calculated according to the weights W1 to W3, so as to complete the moisture absorption test. The results are shown in Table 3. It is noted that W1 is the weight of the fabrics measured in a dry environment (105° C., RH 0%, for 2 hours), W2 is the weight of the fabrics measured in a standard environment (23° C., RH 65%, for 24 hours), and W3 is the weight of the fabrics measured in a high temperature environment (30° C., RH 90%, for 24 hours). It is noted that the aforementioned environments are situations that simulate the possible processes of the fabrics taken out and worn. For example, the dry environment is a situation in which the fabric is not in use, the standard environment is a situation in which the fabric is worn by a wearer under a normal condition (before exercise), and the high temperature environment is a situation in which the fabric is worn by a wearer after exercise, in which the body of the wearer is under a high temperature and high humidity condition.

TABLE 3

|   | moisture regain ratio 1 [(W2-W1)/W1] | moisture regain ratio 2 [(W3-W1)/W1] | moisture absorption ratio (moisture regain ratio 2-moisture regain ratio 1) |
|---|---|---|---|
| embodiment 1 | 0.14 | 0.21 | 0.07 |
| embodiment 2 | 0.07 | 0.14 | 0.07 |
| embodiment 3 | 0.08 | 0.12 | 0.04 |
| comparative example 1 | 0.21 | 0.58 | 0.37 |
| comparative example 2 | 0.07 | 0.24 | 0.17 |

As shown in Table 3, the moisture absorption ratio of the fabrics fabricated by the abrasion resistance fibers of embodiments 1 to 3 of the present disclosure is significantly lower than that of the fabrics fabricated by the fibers of the comparative examples, indicating that the fabrics fabricated by the abrasion resistance fibers of embodiments 1 to 3 of the present disclosure has a better hydrophobicity. Therefore, the fabrics fabricated by the abrasion resistance fibers of the present disclosure can be applied to various products requiring hydrophobic functions. In addition, as the amount of the abrasion agent added increases, the moisture absorption ratio of the fabrics decreases accordingly. Therefore, the amount of abrasion agent added can be adjusted as deemed necessary to meet the needs of products.

<Soaking Time Test>

The abrasion resistance fiber of each embodiment and the fiber of each comparative example are fabricated into fabrics. Next, a water droplet of about 5 ml is dropped from a distance of about 5 cm perpendicularly to a surface of each fabric. The time required for the water droplet to be completely absorbed by each fabric is then recorded. The results are shown in Table 4.

TABLE 4

|  | soaking time (s) |
| --- | --- |
| embodiment 1 | 21 |
| embodiment 2 | 26 |
| embodiment 3 | 30 |
| comparative example 1 | 11 |
| comparative example 2 | 15 |

As shown in Table 4, the soaking time of the fabrics fabricated by the abrasion resistance fibers of embodiments 1 to 3 of the present disclosure is significantly longer than that of the fabrics fabricated by the fibers of the comparative examples, indicating that the fabrics fabricated by the abrasion resistance fibers of embodiments 1 to 3 of the present disclosure has a better hydrophobicity. Therefore, the fabrics fabricated by the abrasion resistance fibers of the present disclosure can be applied to products requiring hydrophobic functions. In addition, as the amount of the abrasion agent added increases, the soaking time of the fabrics increases accordingly. Therefore, the amount of abrasion agent added can be adjusted as deemed necessary to meet the needs of products.

According to the aforementioned embodiments of the present disclosure, the abrasion resistance fiber of the present disclosure includes the fiber body, the abrasion agent, the paraffin-based lubricant, and the antioxidant, in which the abrasion agent includes the silicon dioxide aerogels. The paraffin-based lubricant can make the abrasion agent uniformly dispersed on and attached to the surface of the fiber body, resulting in the abrasion resistance property and hydrophobicity of the abrasion resistance fiber. The antioxidant can prevent the components in the abrasion resistance fiber from degrading, thereby improving the yield of the abrasion resistance fiber. Accordingly, the abrasion resistance fiber of the present disclosure can be applied to products requiring abrasion resistance property and hydrophobicity, having a wide range of applications.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. An abrasion resistance fiber, comprising:
   90.0 parts by weight to 99.0 parts by weight of a fiber body, wherein the fiber body comprises polyethylene terephthalate (PET);
   0.5 parts by weight to 7.5 parts by weight of an abrasion agent, wherein the abrasion agent is attached to a surface of the fiber body, and the abrasion agent comprises silicon dioxide aerogels;
   0.1 parts by weight to 0.5 parts by weight of a paraffin-based lubricant, wherein the paraffin-based lubricant is disposed between the fiber body and the abrasion agent, and a weight-average molecular weight of the paraffin-based lubricant is between 3000 and 10000; and
   0.1 parts by weight to 0.3 parts by weight of an antioxidant.

2. The abrasion resistance fiber of claim 1, wherein the abrasion agent is attached to the surface of the fiber body without infiltrating into the fiber body.

3. The abrasion resistance fiber of claim 1, wherein an abrasion resistance of a fabric fabricated by the abrasion resistance fiber is greater than 2800 cycles under ASTM D3884 test.

4. The abrasion resistance fiber of claim 1, wherein a mean diameter of the abrasion agent is between 1 µm and 20 µm.

5. The abrasion resistance fiber of claim 1, wherein an average density of the abrasion agent is between 0.04 g/cm$^3$ and 0.10 g/cm$^3$.

6. The abrasion resistance fiber of claim 1, wherein a porosity of the silicon dioxide aerogels is between 90% and 99%.

7. The abrasion resistance fiber of claim 1, wherein a mean diameter of the silicon dioxide aerogels is between 10 nm and 30 nm.

8. The abrasion resistance fiber of claim 1, wherein an average surface area of the silicon dioxide aerogels is between 600 m$^2$/g and 800 m$^2$/g.

9. The abrasion resistance fiber of claim 1, wherein a heat resistance temperature of the paraffin-based lubricant is between 290° C. and 300° C.

* * * * *